Sept. 1, 1925.
G. M. BIRK
LABORATORY BALANCE
Filed Feb. 16, 1922
1,551,726
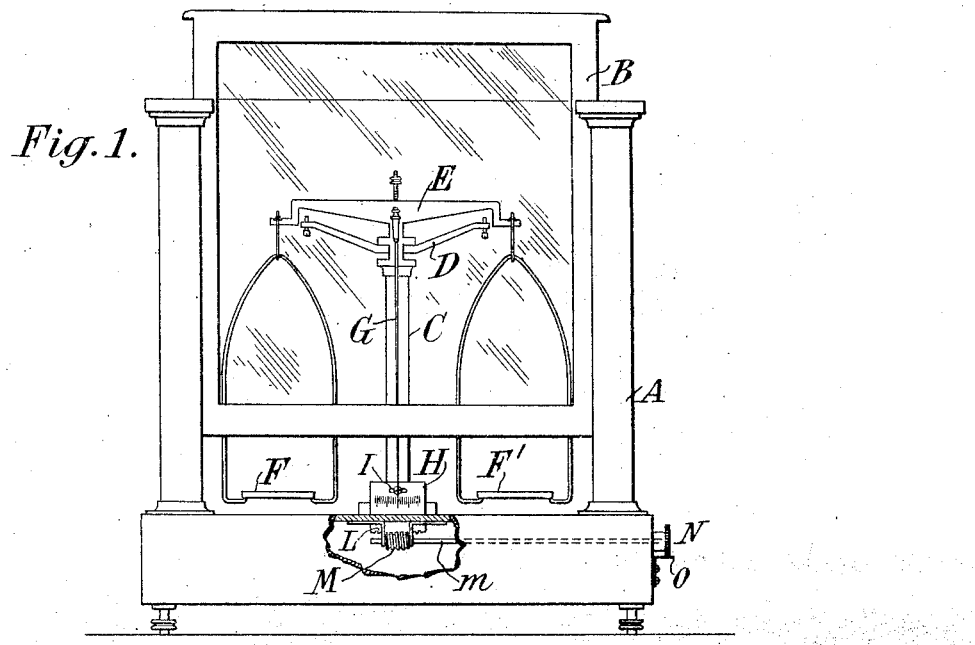
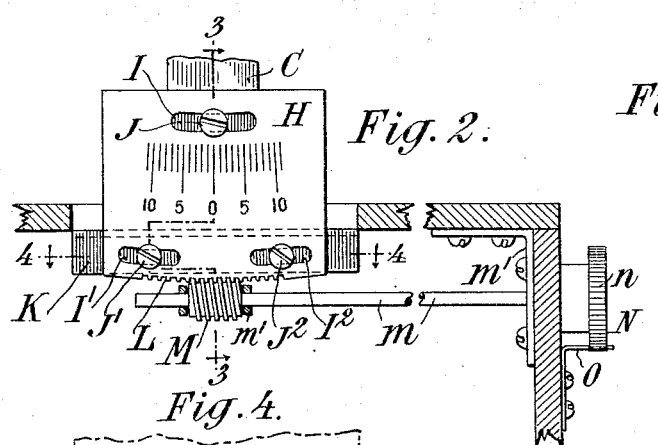
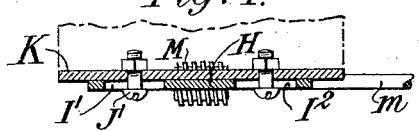
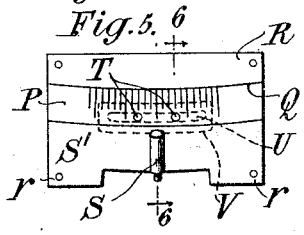
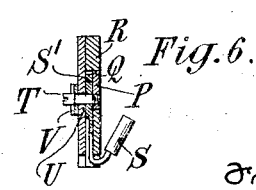
INVENTOR:
Glover M. Birk,
By Attorneys,
Fraser, Junk & Myers Patented Sept. 1, 1925.

1,551,726

UNITED STATES PATENT OFFICE.

GLOVER M. BIRK, OF INDIANAPOLIS, INDIANA, ASSIGNOR TO THE TORSION BALANCE COMPANY, OF NEW YORK, N. Y., A CORPORATION OF NEW YORK.

LABORATORY BALANCE.

Application filed February 16, 1922. Serial No. 537,098.

*To all whom it may concern:*

Be it known that I, GLOVER M. BIRK, a citizen of the United States of America, residing in Indianapolis, in the county of Marion and State of Indiana, have invented certain new and useful Improvements in Laboratory Balances, of which the following is a specification.

The present invention relates to scales and laboratory balances, and aims to provide certain improvements therein.

Such balances are usually provided with a graduated index member past which the pointer carried by the scale beam moves. When the balance is in proper adjustment, the beam upon being released from its support on the beam arrest will be balanced on its fulcrum axis and the pointer will coincide with the zero on the index member. When out of true equilibrium due to varying conditions of temperature, level, or the like, affecting the balance, the pointer will not coincide with the zero of the index member, but will take a position at either side thereof. To remedy this the manipulation of the leveling screws or the adjusting screw usually carried by the balance beam must be resorted to. These means of adjustment usually take considerable time and in actual practice many operators will weigh from the point (at either side of zero) at which the pointer indicates equilibrium rather than readjust the balance.

According to the present invention I provide a simple and rapid means of adjusting the pointer at zero, and thus overcome the uncertainty and inconvenience of weighing from an imaginary zero. This is accomplished by making the index member or some indicator movable preferably laterally, in an arc, so that the zero thereon can be readily brought into coincidence with the pointer. The index member is designed to be manually moved, and preferably by means on the exterior of the case, in such balances that are housed. Suitable means are also provided for maintaining the index in adjusted position. The invention also comprehends certain other features of improvement which will be hereinafter more fully set forth.

Referring to the drawings:

Figure 1 is a front elevation of a balance having the invention embodied therein.

Fig. 2 is an enlarged elevation of the movable index and the means for moving the same, a portion of the balance being shown in section.

Fig. 3 is a transverse section taken on the line 3—3 of Fig. 2.

Fig. 4 is a longitudinal section taken on the line 4—4 of Fig. 2.

Fig. 5 is an elevation of a modified form of the invention.

Fig. 6 is a transverse section taken on the line 6—6 of Fig. 5.

Referring first to Figs. 1 to 4 of the drawings there is shown a conventional form of laboratory balance comprising an enclosing case A having a slidable glass door B, said case enclosing the balance mechanism consisting of a column C supporting the beam arrest D, a balance beam E supporting a pair of scale pans F, F' and carrying an indicator or pointer G, all of which may be of any improved construction. The pointer G is adapted to swing over or past an index member H having graduations thereon, during the course of a weighing operation.

Preliminary to commencing any weighing operation it is important that the position of the pointer with relation to the zero index be determined. If for any cause such as temperature change, level, or the like, the balance be out of equilibrium it is desirable for convenience that the pointer and zero index be brought into coincidence before commencing the weighing operation. According to the present invention this is accomplished in a simple and rapid manner by having for instance the index member H movable laterally with respect to the indicator so that by a slight lateral movement of the index member the zero and pointer may be brought into coincidence. In order to permit this lateral shifting of the index member H, I provide it with a lateral slot I adjacent its top through which passes a fastening member J connecting the member to the column C. Similar slots I' and I² are provided adjacent the bottom of the index member through which fastening means J' and J² pass and connect the index member with a suitable support, herein shown as a bracket K fastened to the underside of the base of the balance. Lateral movement of the index member H is accomplished by forming the lower edge of the member H as a rack L and having it geared to a worm M mounted on a suitable shaft $m$ which is rotatable by a thumb wheel N located at the side of the balance. The shaft $m$ which carries the worm M may be supported in any suitable manner, herein shown as bracket supports $m'$. To insure against any accidental shifting of the index member from its adjusted position the thumb wheel N is provided with a knurled or grooved head $n$ cooperating with a spring pawl or detent device O fastened to the balance case. Since the pointer G in its swinging movement describes an arc, it is preferable that the index member H be also movable in an arc. Such arcuate movement of the index member is provided by having the slots I, I', I$^2$ of arcuate form.

In Figs. 5 and 6 I have shown another manner of providing an adjustable index member. As herein shown it consists of an arcuate band P having indicia thereon and being slidable in a correspondingly shaped groove Q formed in the face of the supporting plate R. The index member or band P is movable laterally by means of a manually operable arm S which carries a plate S' secured to the back of the band P by screws T. These screws T are movable in a slot U formed in the back of the plate R, thus permitting the relative movement between the band P and plate R. To maintain the band P in any position to which it has been moved, there is employed a flat spring V acting against the back of the plate R and serving to hold the band P in frictional tight engagement in the groove Q. The supporting plate R may be suitably mounted at the column base of the balance by passing securing elements through the openings $r$ located in the corners of the plate.

From the foregoing description it will be appreciated that I have provided suitable means for accomplishing the objects hereinbefore set forth. In Figs. 1 to 4 I have shown the index member as being manually adjustable from the exterior of the balance case housing the balance mechanism, while in Figs. 5 and 6 I have shown the means for accomplishing this, as being arranged adjacent the index member. It will be understood, however, that the arm S of the device shown in Figs. 5 and 6 might be extended through the base of the balance and outwardly to the front face thereof for manipulation from the outside of the balance case.

While I have shown several embodiments of the invention I do not wish to be limited to the specific details disclosed since various changes may be resorted to without departing from the spirit of the invention.

I claim as my invention:

1. A scale or balance comprising a stand and an index member mounted thereon, and means for manually adjusting the index member, comprising a rack carried by the index member.

2. A scale or balance comprising a stand and an index member mounted thereon enclosed within a case, and means for manually adjusting the index member from the exterior of the case, comprising a rack carried by the index member and a worm controlled by a manually operable member on the outside of the case.

3. A scale or balance comprising a stand, a beam carrying a pointer, and a laterally-adjustable index member mounted on the stand, a case enclosing said members, means accessible exterior to the case for adjusting the index member, and a spring holding the index member in adjusted position.

In witness whereof, I have hereunto signed my name.

GLOVER M. BIRK.